United States Patent
Zulauf

(10) Patent No.: US 8,606,998 B2
(45) Date of Patent: Dec. 10, 2013

(54) SYSTEM AND METHOD FOR INSTRUCTION-BASED CACHE ALLOCATION POLICIES

(75) Inventor: John M. Zulauf, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1509 days.

(21) Appl. No.: 11/509,178

(22) Filed: Aug. 24, 2006

(65) Prior Publication Data
US 2008/0052466 A1   Feb. 28, 2008

(51) Int. Cl.
*G06F 12/16* (2006.01)

(52) U.S. Cl.
USPC .......................................................... 711/125

(58) Field of Classification Search
None
See application file for complete search history.

(56) References Cited

U.S. PATENT DOCUMENTS

| | | | |
|---|---|---|---|
| 4,181,937 A | 1/1980 | Hattori et al. | |
| 4,458,310 A | 7/1984 | Chang | |
| 4,464,712 A | 8/1984 | Fletcher | |
| 4,513,367 A | 4/1985 | Chan et al. | |
| 4,928,239 A | 5/1990 | Baum et al. | |
| 5,261,066 A | 11/1993 | Jouppi et al. | |
| 5,274,790 A | 12/1993 | Suzuki | |
| 5,539,893 A | 7/1996 | Thompson et al. | |
| 5,581,725 A | 12/1996 | Nakayama | |
| 5,623,627 A | 4/1997 | Witt | |
| 5,687,338 A | 11/1997 | Boggs et al. | |
| 5,696,947 A | 12/1997 | Johns et al. | |
| 5,729,713 A | 3/1998 | Leyrer | |
| 5,752,274 A | 5/1998 | Garibay et al. | |
| 5,778,430 A | 7/1998 | Ish et al. | |
| 5,787,490 A | 7/1998 | Ozawa | |
| 5,809,271 A | 9/1998 | Colwell et al. | |
| 5,870,599 A | 2/1999 | Hinton et al. | |
| 5,958,045 A * | 9/1999 | Pickett .......................... | 712/229 |
| 6,078,992 A | 6/2000 | Hum | |
| 6,105,111 A | 8/2000 | Hammarlund et al. | |
| 6,151,661 A * | 11/2000 | Adams et al. ................. | 711/132 |

(Continued)

FOREIGN PATENT DOCUMENTS

| | | |
|---|---|---|
| EP | 0250702 A2 | 1/1988 |
| EP | 0405318 A2 | 1/1991 |
| EP | 0779581 A2 | 6/1997 |
| JP | 62099845 | 9/1987 |

OTHER PUBLICATIONS

IBM Corp., "Realizing an L2 As An Extension of An L1"; IBM Technical Disclosure Bulletin, IBM Corp. New York, US; vol. 36, No. 12; Dec. 1, 1993; pp. 143-144.

(Continued)

*Primary Examiner* — Duc Doan
(74) *Attorney, Agent, or Firm* — Polansky & Associates, P.L.L.C.; Paul J. Polansky

(57) ABSTRACT

A cache is configured to have a first cache line allocation policy for a memory address. An instruction associated with the memory address is received and a second cache line allocation policy is determined based on the instruction. The cache is reconfigured to have the second cache line allocation policy in response to receiving the instruction. A data processor includes processor core to receive and execute an instruction associated with a memory address, a cache including a plurality of cache lines, and a cache allocation module to determine a cache line allocation policy based on the instruction and to reconfigure the cache to have the cache line allocation policy for execution of the instruction at the processor core.

13 Claims, 5 Drawing Sheets

(56) References Cited

U.S. PATENT DOCUMENTS

| | | | |
|---|---|---|---|
| 6,151,662 A | 11/2000 | Christie et al. | |
| 6,216,206 B1 | 4/2001 | Peled et al. | |
| 6,223,256 B1 | 4/2001 | Gaither | |
| 6,349,365 B1 | 2/2002 | McBride | |
| 6,370,618 B1 | 4/2002 | Arimilli et al. | |
| 6,370,622 B1 | 4/2002 | Chiou et al. | |
| 6,385,695 B1 | 5/2002 | Arimilli et al. | |
| 6,397,296 B1 | 5/2002 | Werner | |
| 6,434,669 B1 * | 8/2002 | Arimilli et al. | 711/128 |
| 6,591,347 B2 | 7/2003 | Tischler et al. | |
| 6,678,795 B1 * | 1/2004 | Moreno et al. | 711/137 |
| 6,725,337 B1 | 4/2004 | Tan et al. | |
| 6,728,835 B1 | 4/2004 | Bauman et al. | |
| 6,772,291 B2 | 8/2004 | Palanca et al. | |
| 6,845,432 B2 | 1/2005 | Maiyuran et al. | |
| 6,901,477 B2 | 5/2005 | Sullivan | |
| 7,099,998 B1 * | 8/2006 | Berkovits | 711/134 |
| 7,103,721 B2 | 9/2006 | Cargnoni et al. | |
| 7,392,340 B1 * | 6/2008 | Dang et al. | 711/111 |
| 2002/0013887 A1 | 1/2002 | Ting | |
| 2003/0140195 A1 | 7/2003 | Borkenhagen et al. | |
| 2004/0015660 A1 | 1/2004 | Benveniste et al. | |
| 2004/0078524 A1 | 4/2004 | Robinson | |
| 2004/0098541 A1 | 5/2004 | Megiddo et al. | |
| 2004/0215890 A1 | 10/2004 | Cargnoni et al. | |
| 2004/0268099 A1 | 12/2004 | Smith et al. | |
| 2005/0091457 A1 | 4/2005 | Auld et al. | |
| 2005/0188158 A1 | 8/2005 | Schubert | |
| 2005/0235114 A1 * | 10/2005 | Megiddo et al. | 711/118 |

OTHER PUBLICATIONS

Jouppi et al., "Improving Direct-Mapped Cache Performance by the Addition of a Small Fully-Associative Cache and Prefetch Buffers," Proc. 17th International Symposium Computer Architecture, May 1990, pp. 364-373.

Stiliadis et al., "Selective Victim Caching: A Method to Improve the Performance of Direct-Mapped Caches," IEEE Transactions on Computers, vol. 46, No. 5, May 1997, pp. 603-610.

John et al., "Design and Performance Evaluation of a Cache Assist to Implement Selective Caching," 1997 IEEE International Conference on Computer Design: VLSI in Computers and Processors, 1997, ICCD '97 Proceedings, Oct. 12-18, 1997, pp. 510-518.

"6.5 Cache Architecture," printed from URL <<http://webster.cs.ucr.edu/AoA/Windows/HTML/MemoryArchitecturea2.html>> on Nov. 27, 2006, 6 pages.

Intel Architecture Software Developer's Manual vol. 1: Basic Architecture, 1997, Intel Corporation, p. 6-34 to 6-36.

"set associative cache"; printed from URL <<http://www.cacs.louisiana.edu/~mgr/404/burks/foldoc/92/104.htm>> on May 14, 2007, 1 page.

"Cache Mapping and Associativity"; printed from URL http://www.pcguide.com/ref/mbsys/cache/funcMapping-c.html on May 14, 2007, 2 pages, updated Apr. 17, 2001.

"REP/REPE/REPZ/REPNE/REPNZ—Repeat Following String Operation," 80386 Programmer's Reference Manual—Opcode REP, 2 pgs, downloaded from URL <<"http://i386.cybersabotage.com/rep/html">> on Dec. 9, 2004.

Actions on the Merits by the U.S.P.T.O. as of Sep. 21, 2007, 3 pages.

* cited by examiner

SYSTEM AND METHOD FOR INSTRUCTION-BASED CACHE ALLOCATION POLICIES

CROSS-REFERENCE TO RELATED APPLICATIONS

The present application is related to U.S. patent application Ser. No. 11/052,432, entitled "SYSTEM FOR RESTRICTED CACHE ACCESS DURING DATA TRANSFERS AND METHOD THEREOF," and filed on Feb. 7, 2005, the entirety of which is incorporated by reference herein.

FIELD OF THE DISCLOSURE

The present disclosure is related generally to caching in processing systems and more specifically to configuring cache line allocations.

BACKGROUND

Cache memories often are utilized in processing systems to store information such as operand data or instruction data to be utilized by a processor or to be subsequently stored in more permanent memory, such as system memory or a hard disk. In the event of a read operation or a write operation resulting from the execution of an instruction, a copy of the data read from memory or the data to be written to memory is provided to the cache for potential storage. The cache, in turn, determines whether to allocate a cache line for storage of the supplied data based on the cache line allocation policy for the memory address or memory region that is associated with the read operation or write operation. Typically, a cache implements a default cache line allocation policy for a particular memory address or memory region without regard to the particular characteristics or circumstances of the instruction being executed. However, the default cache line allocation policy may not be the most appropriate policy for a given application or instruction sequence. Accordingly, an improved technique for configuring cache allocations in a cache would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DRAWINGS

Figure 1:
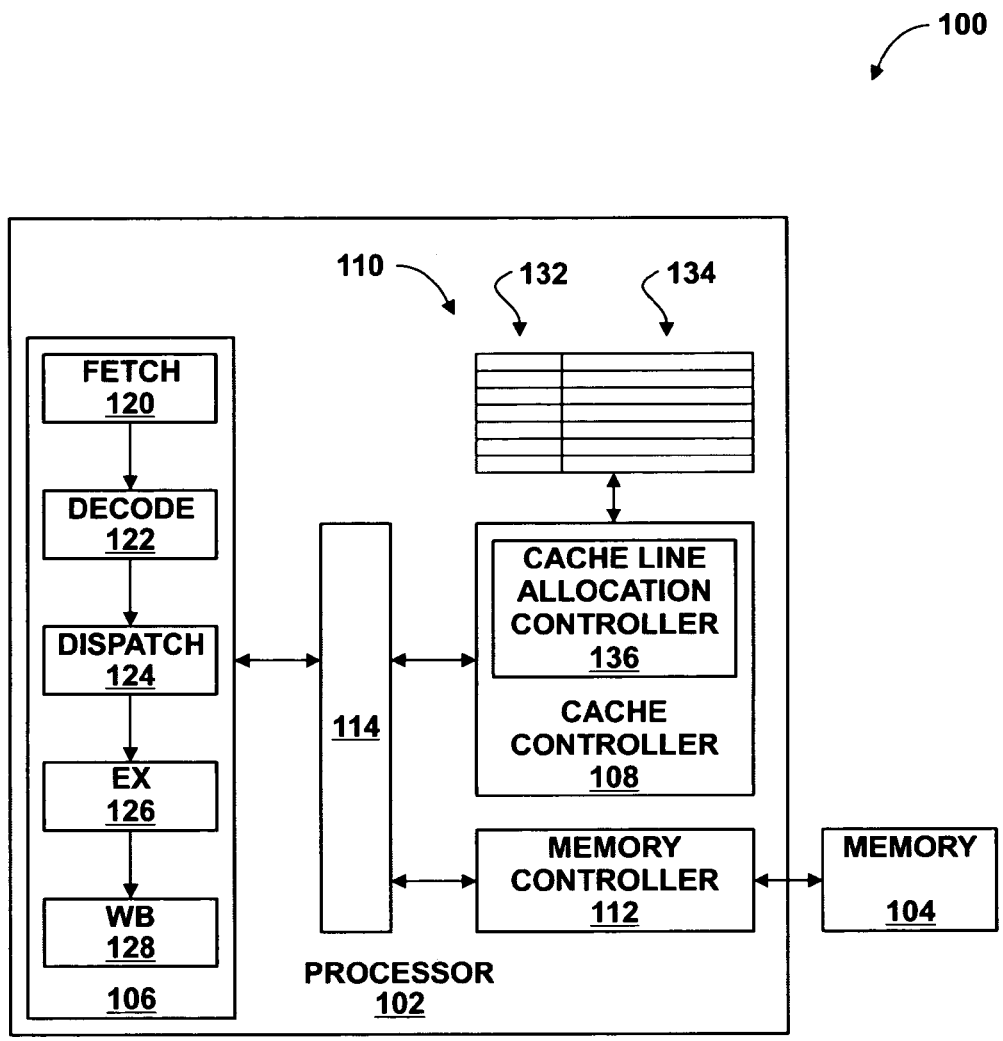
FIG. 1 is a block diagram illustrating an exemplary processing system utilizing instruction-dependent cache allocation policies in accordance with at least one embodiment of the present disclosure.

In accordance with one aspect of the present disclosure, a method includes configuring a cache to have a first cache line allocation policy for a memory address, receiving an instruction associated with the memory address, and determining a second cache line allocation policy based on the instruction. The method further includes reconfiguring the cache to have the second cache line allocation policy in response to receiving the instruction.

In accordance with another aspect of the present disclosure, a method includes receiving, at data processor, a first sequence of instructions, the first sequence of instructions including a first instruction, a second instruction to be executed subsequent to the first instruction, and a third instruction to be executed subsequent to the second instruction. The second instruction includes an instruction to configure a cache associated with the data processor to have a first cache line allocation policy. The method further includes configuring the cache to have a second cache line allocation policy and executing the first instruction subsequent to configuring the cache to have the second cache line allocation policy. The method also includes executing the second instruction to configure the cache to have the first cache line allocation policy subsequent to executing the first instruction and executing the third instruction subsequent to executing the second instruction.

In accordance with yet another aspect of the present disclosure, a data processor includes a processor core to receive and execute an instruction associated with a memory address, a cache including a plurality of cache lines, and a cache allocation module to determine a first cache line allocation policy based on the instruction and to reconfigure the cache to have the first cache line allocation policy for execution of the instruction at the processor core.

FIGS. 1-7 illustrate exemplary systems and techniques for instruction-dependent cache line allocation. In one embodiment, an alternate cache line allocation policy for a memory address or memory region is determined based on an instruction to be executed and the cache is reconfigured to implement the alternate cache line allocation policy for the execution of the instruction and the caching of data associated with the instruction. The determination of the alternate cache line allocation policy can be based on an inherent characteristic of the specific instruction, such as the instruction type of the specific instruction as represented by a prefix or an opcode of the instruction. Alternately, the alternate cache line allocation policy can be based on information associated with prior executions of other instructions that utilize the same memory address or region, such as, for example, the number of times a memory address associated with the execution of an instruction is also accessed by other executed instructions over a given execution period. In another embodiment, the instruction itself is an instruction to change the cache line allocation policy of the cache (hereinafter, "a cache allocation instruction"). Thus, the execution of the cache allocation instruction causes an execution unit or other processor component to directly modify the cache so as to implement a cache line allocation policy identified by the cache allocation instruction. Further, in certain instances, the cache can implement a policy arbitration scheme whereby authorization to modify certain cache line allocation policies can be denied, thereby ensuring that the default cache line allocation policy remains enforced for certain memory addresses or memory regions.

The term "cache line allocation policy," as used herein, refers to the caching actions permitted for a particular read/write event. Examples of caching actions can include, for example, "no caching" (e.g., the memory region is uncacheable), "read allocation" (e.g., allocate a cache line only for a read event but not a write event), "write allocation" (e.g., allocate a cache line only for a write event but not a read event), "read/write allocation" (e.g., allocate a cache line for both write events and read events). A cache line allocation policy also can indicate the timing or other constraints on caching actions. To illustrate, one cache line allocation policy can designate a certain write action as a write-through action whereby any write to the cache associated with the write action also is immediately propagated to memory, whereas another cache line allocation policy may designate the write action as a write-back action whereby the memory is updated with the cached data upon eviction of the cached data from the cache.

FIG. 1 illustrates an exemplary processing system 100 that utilizes instruction-dependent cache line allocation policies in accordance with at least one embodiment of the present disclosure. In the depicted example, the processing system 100 includes a processor 102 and a memory 104. The processor 102 includes a processing core 106 (e.g., a central processing core or CPU), a cache controller 108, a cache 110, and a memory controller 112 connected via an interconnect 114 (e.g., one or more buses or cross-bar switches). The processor 102 represents, for example, a microprocessor or a microcontroller, and can be implemented as a single integrated circuit, such as a system-on-a-chip (SOC) or an application specific integrated circuit (ASIC). The memory 104 can include, for example, system memory implemented as random access memory (RAM).

The processing core 106 includes an instruction execution pipeline comprising, for example, an instruction fetch stage 120 for fetching instruction data from a cache, such as the cache 110, an instruction decode stage 122 for decoding fetched instruction data to generate one or more instructions, a dispatch stage 124 for ordering and dispatching instructions, an execution stage 126 having an integer unit and a floating point unit for executing dispatched instructions, and a write back stage 128 for storing the results of the executed instructions back to the cache 110 or the memory 104. The memory controller 112 interfaces with the memory 104 to perform memory transactions initiated by the processing core 106 or the cache controller 108.

The cache 110 can include a data cache, an instruction cache, or a data and instruction cache (i.e., a unified cache) and may be implemented as a fully-associative cache or a set-associative cache. As illustrated, the cache 110 includes a tag array 132 and a cache line array 134, whereby each entry of the tag array is associated with a corresponding row of one or more cache lines of the cache array 134 and stores a memory address portion associated with the data stored in the cache lines of the corresponding row.

The cache controller 108 manages cache transactions initiated by the processing core 106. Further, in the illustrated example, the cache controller 108 includes a cache line allocation controller 136 to determine the cache line allocation polices for the cache 110 and to configure the cache controller 108 to comply with the selected cache line allocation policies. The cache line allocation controller 136 may be implemented as hardware, firmware, software, or a combination thereof. To illustrate, FIG. 1 illustrates the cache line allocation controller 136 as a hardware component of the cache controller 108. Alternately, the cache line allocation controller 136 may be implemented as, for example, a set of microcode executed by the processing core 106 so as to direct the processing core 106 to configure the cache controller 108 to implement a certain cache line allocation policy, or the cache line allocation controller 136 may be implemented as, for example, a hardware component of the processing core 106 or otherwise separate from the cache controller 108.

In operation, the cache line allocation controller 136 initially configures the cache controller 108 to implement default (or instruction independent) cache line allocation polices for corresponding memory addresses or memory regions (or to implement a default global cache line allocation policy). As the execution of instructions commences, the cache allocation controller 136 is notified of an instruction to be executed and, based on the instruction and other information, the cache allocation controller 136 configures the cache controller 108 to implement an alternate cache line allocation policy (other than the default cache line allocation policy) for the instruction if so warranted by the instruction and by a policy arbitration process.

In the event that the cache line allocation controller 136 is implemented at the cache controller 108 as illustrated in FIG. 1, the cache line allocation controller 136 may be notified of an instruction by the processing core 106 in any of a variety of manners. To illustrate, the instruction fetch stage 120 may notify the cache line allocation controller 136 that a particular instruction has been prefetched and, in response, the cache line allocation controller 136 can initiate the process of identifying an alternate cache line allocation policy, if any, for the instruction concurrent with the pre-execution processing of the instruction by the decode stage 122 and the dispatch stage 124. Alternately, the instruction decode stage 122 can notify the cache line allocation controller 136 once it has decoded instruction data to generate the instruction, or the dispatch stage 124 can notify the cache line allocation controller 136 once it has dispatched the instruction to the execution stage 126. Further, the execution stage 126 may notify the cache line allocation controller 136 of the instruction as execution is initiated, as well as providing post-execution information regarding the instruction to the cache line allocation controller 136, such as whether the execution of the instruction resulted in a memory access. The notification of the instruction can include, for example, a prefix for the instruction, an opcode for the instruction, a memory address associated with the instruction, and the like.

In one implementation, the cache line allocation controller 136 can determine an alternate cache line allocation policy based on the instruction itself, such as by performing a table-lookup based on the instruction type, as indicated by a prefix, opcode, or other identifier associated with the instruction. In another implementation, the cache allocation controller 136 can determine an alternate cache line allocation policy based on accesses to the same memory address by other instructions (or the same instruction) over a given execution period. To illustrate, for a particular instruction associated with a particular memory address, the cache allocation controller 136 can increment a count associated with the instruction each time an instruction accesses the particular memory address over a given execution period, and once the count exceeds a predetermined threshold, an alternate cache line allocation policy can be implemented for the instruction or instruction-type as to allow cache line allocation for the next instance of the instruction or instruction type. Conversely, in the event that the count of accesses to the particular memory address fails to exceed a certain threshold, the cache line allocation controller 136 may elect to implement an alternate cache line allocation policy whereby cache line allocations for the instruction are denied.

In addition to, or rather than, implementing an alternate cache line allocation policy for an instruction based on the instruction itself, the cache line allocation policy for a given memory region can be reconfigured by the execution of an instruction having an express purpose of reconfiguring a cache line allocation policy of the cache 110. To illustrate, it may be advantageous to permit cache line allocation for an identified instruction in a tight loop that is executed numerous times while denying cache line allocation for all other instructions operating on the same memory region. Accordingly, a cache allocation instruction can be executed prior to the execution of the identified instruction so as to change the cache line allocation policy for the benefit of the identified instruction. In such instances, the execution of the cache allocation instruction manipulates the execution stage 126 or the writeback stage 128 to directly reconfigure the cache line allocation policy of the corresponding memory region for the cache 110. For example, the instruction sequence can be arranged so that a first cache allocation instruction can be dispatched to the execution stage 126 prior to the dispatch of the identified instruction so as to change a default cache line allocation policy that denies all cache line allocation to one that permits cache line allocation. Accordingly, when the identified instruction is executed, its associated data can be cached in the cache 110 due to the change in the cache line allocation policy. The instruction sequence then can include a second cache line allocation instruction dispatched to the execution stage 126 subsequent to the identified instruction so as to revert the cache 110 back to the default cache line allocation policy. The implementation of cache allocation instructions is described in greater detail herein with reference to FIGS. 6 and 7.

Further, in one embodiment, the reconfiguration of the cache controller 108 to implement the alternate cache line allocation policy can be conditioned on an authorization to override the default or instruction independent cache line allocation policy. To illustrate, the default cache line allocation policy for a memory region may indicate that a memory address or memory region is uncacheable. In this instance, it may prove problematic to change the cache line allocation policy for this memory address or memory region so that it is cacheable and thus replacement of this default cache line allocation policy with an alternate may be identified as unauthorized or otherwise prohibited. As another example, the default cache line allocation policy for a memory region may be "write back, no write allocate." In this instance, it may be unlikely that changing this default cache line allocation policy would be problematic and thus replacement of this default cache line allocation policy with an alternate may be identified as authorized or otherwise permitted. Accordingly, the cache line allocation controller 136 may be configured to permit or deny the replacement of default cache line allocation policies with instruction-based cache line allocation policies for certain memory addresses or memory regions based on authorization information associated with the default cache line policies.

The alternate cache line allocation policy for a given instruction or instruction type may be determined in any of a variety of ways. In one manner, the alternate cache line allocation policy may be determined by an anticipated usage of the instruction. For example, instructions associated with a program stack often may benefit from a cache line allocation policy that permits cache line allocation because the write operations associated with a PUSH instruction implies a near-term read operation of the data location by a corresponding POP instruction. Thus, permitting cache line allocations for a PUSH instruction to a certain memory region while otherwise denying cache line allocations for the memory region can result in increased efficiency due to the avoidance of a memory access operation for the cache miss of a subsequent POP operation that otherwise would have resulted had no cache line been allocated for the data stored by the PUSH instruction.

In another manner, the alternate cache line allocation policy may be determined based on an analysis of the instruction in the context of the program to which it belongs, or determined based on an empirical analysis of the execution of the program. To illustrate, a certain instruction may occur in a tight loop that is expected to be executed numerous times. Accordingly, it likely would be advantageous to permit cache line allocation for this instruction so as to reduce the likelihood of cache misses, even while denying cache line allocation to other instructions operating on the same memory address or memory region. In contrast, it may be determined that instructions of a certain type rarely result in a memory access, even if caching is permitted for these instructions by default. Accordingly, it may prove beneficial to disable cache line allocation for these instructions so as to free up the cache for other data, even while permitting cache line allocation for other instructions operating on the same memory region.

Figure 2:
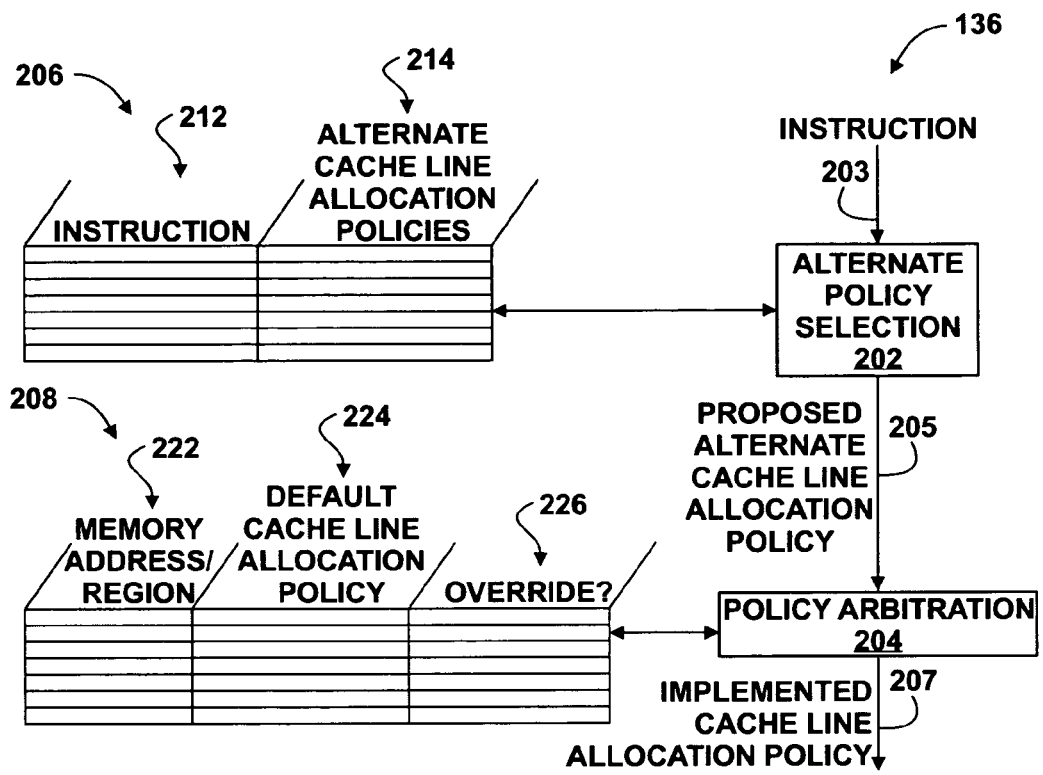
FIG. 2 is a block diagram illustrating an exemplary implementation of a cache allocation controller of the processing system of FIG. 1 in accordance with at least one embodiment of the present disclosure.

FIG. 2 illustrates an exemplary implementation of the cache line allocation controller 136 of FIG. 1 in accordance with at least one embodiment of the present disclosure. In the example of FIG. 2, the cache line allocation controller 136 includes an alternate policy selection module 202, a policy arbitration module 204, an instruction-based policy table 206, and a default policy table 224. The modules 202 and 204 can be implemented as hardware, firmware, software, or combinations thereof.

The instruction-based policy table 206 provides one or more alternate cache line allocation policies available for listed instructions or instruction types. To illustrate, the instruction-based policy table 206 can include a plurality of entries, each entry having an instruction field 212 that identifies the instruction or instruction type (such as by prefix or opcode) and a corresponding cache line allocation policy field 214 that stores one or more values representative of alternate cache line allocation policies for the identified instruction or instruction type.

The default policy table 208 provides the default cache line allocation policy for each corresponding memory address or memory region. To illustrate, the default policy table 224 can include a plurality of entries, each entry having a memory address field 222 that identifies a respective memory address or memory region, a default cache line allocation policy field 224 that stores a value representative of the corresponding default cache line allocation policy, and a override field 226 that stores a value indicating whether overriding or otherwise replacing the default cache line allocation policy is authorized. For ease of illustration, it is assumed for the following discussion that the override field 226 stores a one-bit value that indicates whether overriding the default cache line allocation policy is authorized for any and all alternate cache line polices. However, it will be appreciated that in other implementations the override field 226 can store a multibit value so as to further refine which types of alternate cache line allocation polices are authorized and which types are not authorized for a given default cache line allocation policy.

The alternate policy selection module 202 has access to the instruction-dependent policy table 206 and includes an input to receive a notification 203 of an instruction to be executed and outputs to provide a proposed alternate cache line allocation policy 205 based on the instruction and the instruction-dependent policy table 206. In operation, the alternate policy selection module 202 performs a table lookup in the instruction-dependent policy table 206 in response to receiving the notification 203, using, for example, the prefix or opcode of the instruction as the index for the instruction type field 212. Based on the table lookup, the alternate policy selection module 202 selects an alternate cache line allocation policy for the instruction, if any, from the corresponding cache line allocation policy field 214 and provides a representation of the selected cache line allocation policy as the proposed alternate cache line allocation policy 205.

The policy arbitration module 204 has access to the default policy table 208 and includes an input to receive the proposed alternate cache line allocation policy 205 and an output to provide an indication of the cache line allocation policy to be implemented by the cache controller 108 (hereinafter, the implemented cache line allocation policy 207). In one embodiment, the implemented cache line allocation policy 207 is represented by a value written to a register or a set of signals which controls the caching actions taken by the cache controller 108 with respect to the corresponding memory address or memory region.

In operation, the policy arbitration module 204 performs a table lookup in the default policy table 208 to determine whether overriding the default cache line allocation policy for the memory address or memory region is authorized based on the override field 236. In the event that no alternate cache line allocation policy exists for the instruction, or in the event that overriding the default cache line allocation policy is not authorized, provides an indication of the default cache line allocation policy as the implemented cache line allocation policy 207, thereby configuring the cache controller 108 so that the default cache line allocation policy is remains in place for the cache 110. Otherwise, if there is an alternate cache line allocation policy and overriding the default cache line allocation policy is authorized, the policy arbitration module 204 provides an indicator of the alternate cache line allocation policy as the implemented cache line allocation policy 207, thereby configuring the cache controller 108 so that the alternate cache line allocation policy is implemented for the cache 110.

Figure 3:
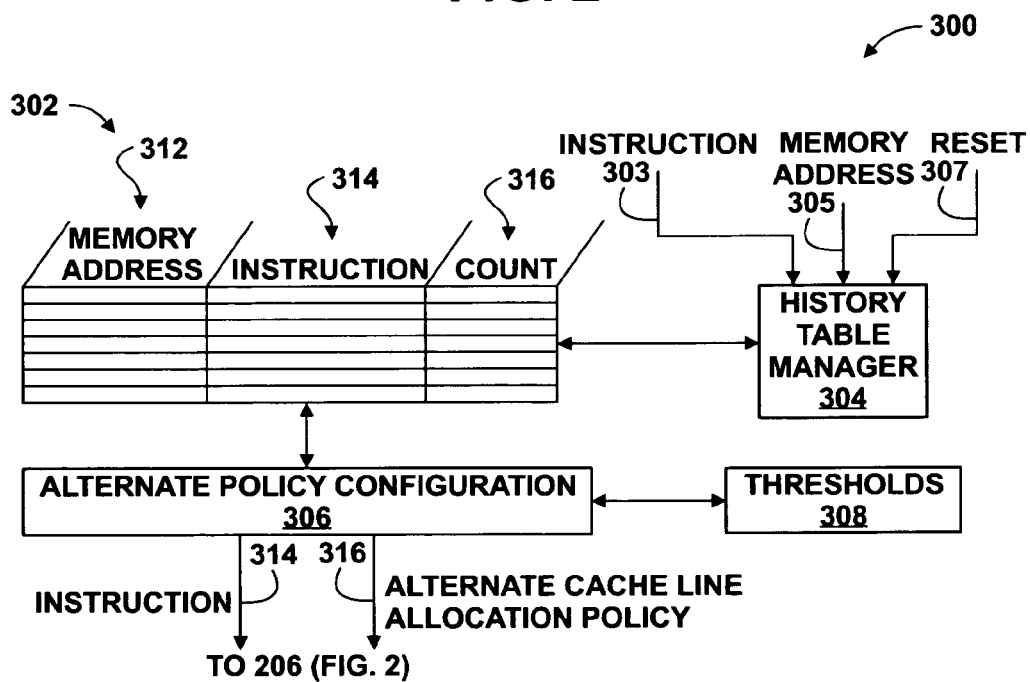
FIG. 3 is a block diagram illustrating an alternate exemplary implementation of the cache allocation controller of the processing system of FIG. 1 in accordance with at least one embodiment of the present disclosure.

FIG. 3 illustrates a controller 300 for configuring the instruction-dependent policy table 206 of FIG. 2 in accordance with at least one embodiment of the present disclosure. In the example of FIG. 3, the controller 300 includes an instruction history table 302, a history table manager module 304, an alternate policy configuration module 306, and a threshold table 308. The modules 304 and 306 can be implemented as hardware, firmware, software, or combinations thereof.

The instruction history table 302 provides a history of memory access to identified memory addresses or memory regions over an execution period. To illustrate, the instruction history table 302 can include a plurality of entries, each entry having a memory address field 312 that identifies the corresponding memory address or memory region, an instruction field 314 that identifies an instruction or instruction type (such as by prefix or opcode), and a corresponding count field 316 that stores a value representative of the number of times a memory access has accessed the corresponding memory address or memory region over a given execution period.

The history table manager module 304 has access to the instruction history table 302 and includes inputs to receive a notification 303 of an executed instruction, a memory address signal 305 representative of the memory address of a respective memory transaction, and a reset signal 307. The notification 303 is provided by the processing core 102 (FIG. 1) in response to the execution of an instruction, where the notification 303 indicates the instruction or instruction type, and the memory address signal 305 is provided by the processing core 102 or other component, for example, as part of a memory transaction snooped by the cache controller 108.

In operation, the history table manager module 304 generates an entry in the instruction history table 302 for the first occurrence of a given instruction during an execution period that results in a write event, whereby the entry includes an identifier of the instruction (e.g., the instruction pointer or counter for a specific instruction or an instruction-type identifier if processed based on type), the memory address or memory region associated with the instruction, and initializes the corresponding count field 316 to zero or some other initial value. For each subsequent instruction during the execution period that results in an access to the indicated memory address or memory region (as indicated by, for example, the memory address snooped from a memory transaction), the history table manager module 304 increments the count in the count field 316 of the corresponding entry of the instruction history table 306. When the reset signal 307 is asserted, thereby indicating the end of an execution period as determined by a number of clock cycles or a number of instructions executed, the history table manager module 304 clears the count fields 314 of information history table 306 and begins counting memory accesses afresh.

The alternate policy configuration module 306 has access to the instruction history table 302 and the threshold table 308 and includes outputs to provide an instruction signal 314 indicating an instruction or instruction type and a policy signal 316 indicating an alternate cache line allocation policy for storage as an entry (or for replacing an entry) in the instruction-dependent policy table 206. In one implementation, the alternate policy configuration module 306 sequentially accesses each entry in the instruction history table 302 in response to a predetermined event, such as the expiration of a counter. For each entry, the alternate policy configuration module 306 determines the number of memory accesses as indicated by the corresponding count field 316. Further, the alternate policy configuration module 306 determines one or both of an upper count threshold and a lower count threshold from the threshold table 308.

The alternate policy configuration module 306 then compares the count obtained from the instruction history table 302 with the upper count threshold, if any. In the event that the obtained count exceeds the upper count threshold (thereby indicating that caching the instruction likely would provide a performance gain), the alternate policy configuration module 306 selects an alternate cache line allocation policy that allows cache line allocation for the associated memory address or memory region. Alternately, in the event that the obtained count falls below the lower count threshold (thereby indicating that caching for the instruction likely is not providing a performance gain), the alternate policy configuration module 306 selects an alternate cache line allocation policy that denies cache line allocation for the associated memory address or memory region. After determining the appropriate alternate cache line allocation policy, the alternate policy configuration module 306 provides an indicator of the instruction or instruction type and an indicator of the selected alternate cache line allocation policy as signals 314 and 316, respectively, for storage in the instruction-dependent policy table 206. In another implementation, the alternate policy configuration module 306 is implemented as part of the alternate policy selection module 202 (FIG. 2) and performs the threshold-based policy selection process so as to provide the proposed alternate cache line allocation policy 205 (FIG. 2). Thus, as illustrated by the controller 300 of FIG. 3, the alternate cache line allocation policies for instructions can be dynamically modified in response to prior access history to the corresponding memory address or memory region.

Figure 4:
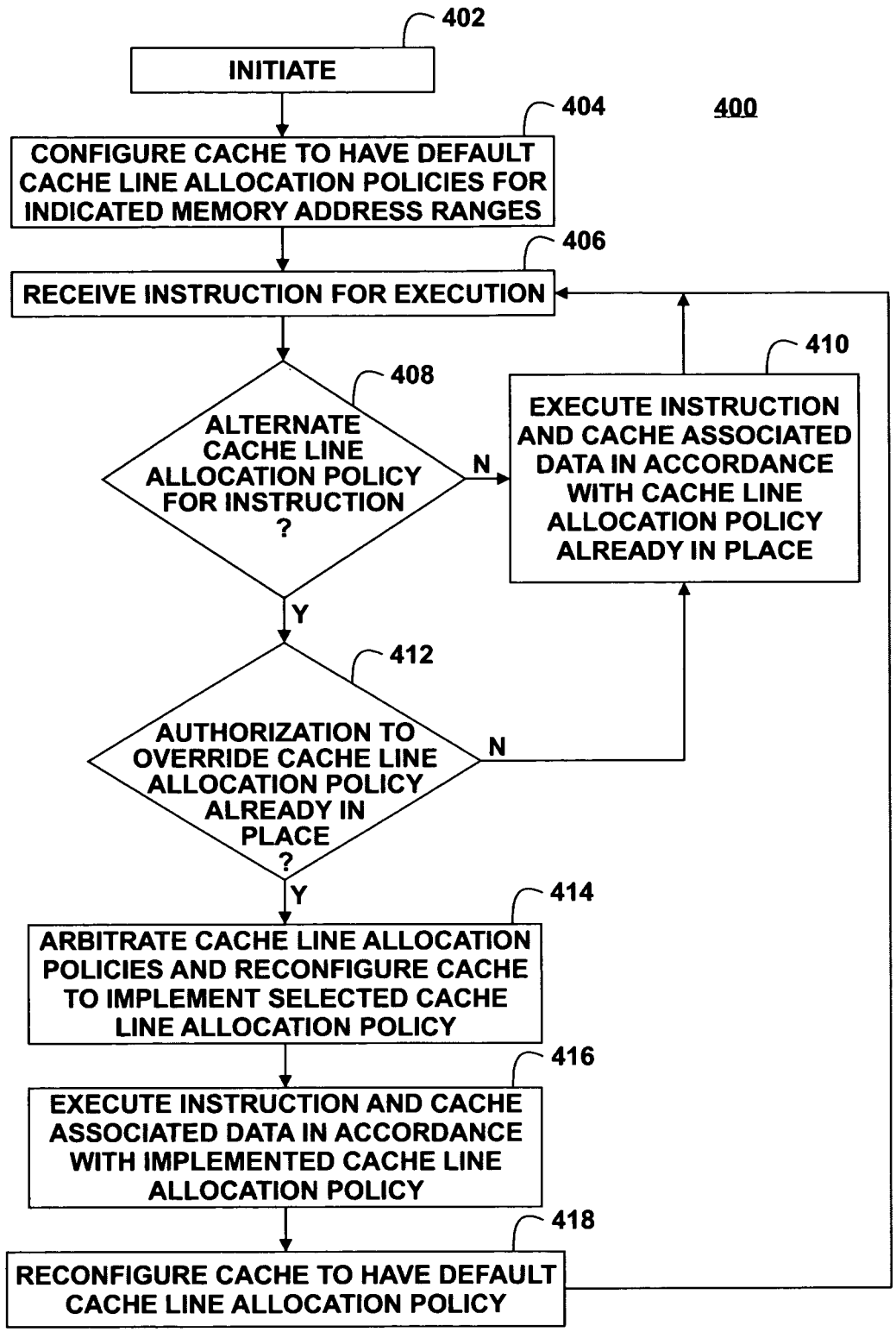
FIG. 4 is a flow diagram illustrating an exemplary method for reconfiguring a cache line allocation policy of a cache based on an instruction in accordance with at least one embodiment of the present disclosure.

FIG. 4 illustrates an exemplary method 400 for reconfiguring the cache line allocation policy of a cache based on an instruction to be executed in accordance with at least one embodiment of the present disclosure. The method 400 includes initiating operation of a processing device having a cache at event 402 in response to an initialization action, such as a power on reset (POR), the loading of a program, and the like. At block 404, the method 400 includes configuring the cache to implement a default, or instruction-independent, cache line allocation policy for each of a plurality of memory addresses or memory regions, or alternately, setting a default global cache line allocation policy. At event 406, processing of an instruction to be executed begins at a processing core (e.g., processing core 106, FIG. 1). Accordingly, at decision block 408, the method 400 includes determining whether there is an alternate cache line allocation policy available for the instruction to be executed. As discussed above, the determination of an alternate cache line allocation policy can be based on a table (e.g., instruction-independent policy table 220, FIG. 2) of alternate cache line allocation polices arranged by instruction or instruction type.

In the event that an alternate cache line allocation policy is not available for the instruction to be executed, the method 400 includes executing the instruction and caching data for the instruction in accordance with the default cache line allocation policy in place at block 410. Otherwise, if an alternate cache line allocation policy is available, the method 400 includes determining an authorization to override the default cache line allocation policy for the memory address or memory region at decision block 412. As discussed above, authorization to override can be indicated as, for example, an override bit or bits associated with the default cache line allocation policy.

In the event that overriding the default cache line allocation policy is not authorized, the method 400 flows to block 410, whereby the instruction is executed and associated data is cached according to the default cache line allocation policy already in place. Alternately, the lack of authorization could result in the generation of an exception, thereby indicating a possible error condition. In the event that overriding the default cache line allocation policy is authorized, at block 414 the method 400 includes arbitrating between the alternate cache line allocation policy and the default cache line allocation policy based on any of a variety of criteria so as to select an cache line allocation policy to be implemented from the alternate cache line allocation policy and the default cache line allocation policy. In the event that the arbitration results in keeping the default cache line allocation policy, the method 400 includes maintaining the default cache line allocation policy. Otherwise, if the arbitration results in the selection of the alternate cache line allocation policy, block 412 further includes reconfiguring the cache to implement the alternate cache line allocation policy. In one embodiment, the cache can be configured accordingly by storing a value representative of the alternate cache line allocation policy in one or more registers associated with cache controller that are used to control caching actions of the cache controller.

After reconfiguring the cache, the method 400 includes executing the instruction and caching data associated with the instruction in accordance with the implemented alternate cache line allocation policy at block 416. In certain instances, it may be advantageous to return the cache to the original default cache line allocation policy after the instruction has been executed. In this instance, the method 400 includes reconfiguring the cache to implement the default cache line allocation policy 418 after executing the instruction at block 418 and awaiting the next instruction to be executed at event 406. Alternately, the default cache line allocation policy can remain in place until reconfigured in response to another instruction with a different alternate cache line allocation policy at event 406, until the expiry of a timer, and the like.

Figure 5:
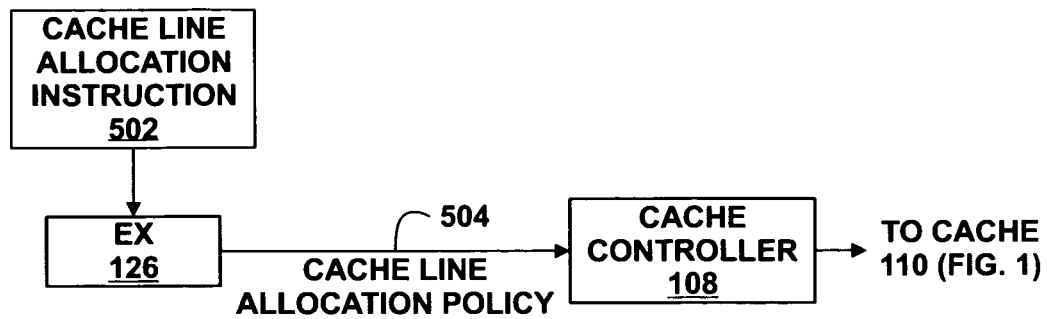
FIG. 5 is a diagram illustrating an exemplary technique for executing an instruction to reconfigure a cache line allocation policy of a cache in accordance with at least one embodiment of the present disclosure.

FIG. 5 illustrates an exemplary technique for configuring a cache line allocation policy during the execution of a cache allocation instruction in accordance with at least one embodiment of the present disclosure.

As discussed above, in addition to, or instead of, reconfiguring a cache to have an alternate cache line allocation policy for an instruction to be executed, in one embodiment, the cache is configured to have an alternate cache line allocation policy through the execution of a cache allocation instruction that manipulates a processing core to directly configure the cache to implement an alternate cache line allocation policy, or to return the cache to the default cache line allocation policy. In the example of FIG. 5, a cache allocation instruction 502 is fetched, pre-processed, and then provided to the execution stage 126 of the processing core 106 (FIG. 1) of the data processor 102 (FIG. 1). The cache allocation instruction 502 includes as an operand a value representative of the alternate cache line allocation policy, or a value that serves as a pointer or index to a stored value representative of the alternate cache line allocation policy. In one embodiment, the execution stage 126 is configured so as store data 504 representative of the alternate cache line allocation policy in one or more registers associated with the controller 108 so as to control the caching actions of the cache controller 108, thereby configuring the cache controller 108 to implement the alternate cache line allocation policy. Alternately, the execution stage 126 may implement a "lightweight" MSR associated with its arithmetic logical unit (ALU) through which cache line allocation policies can be configured. The storing of the data 504 can be implemented as, for example, a microcode instruction.

Figure 6:
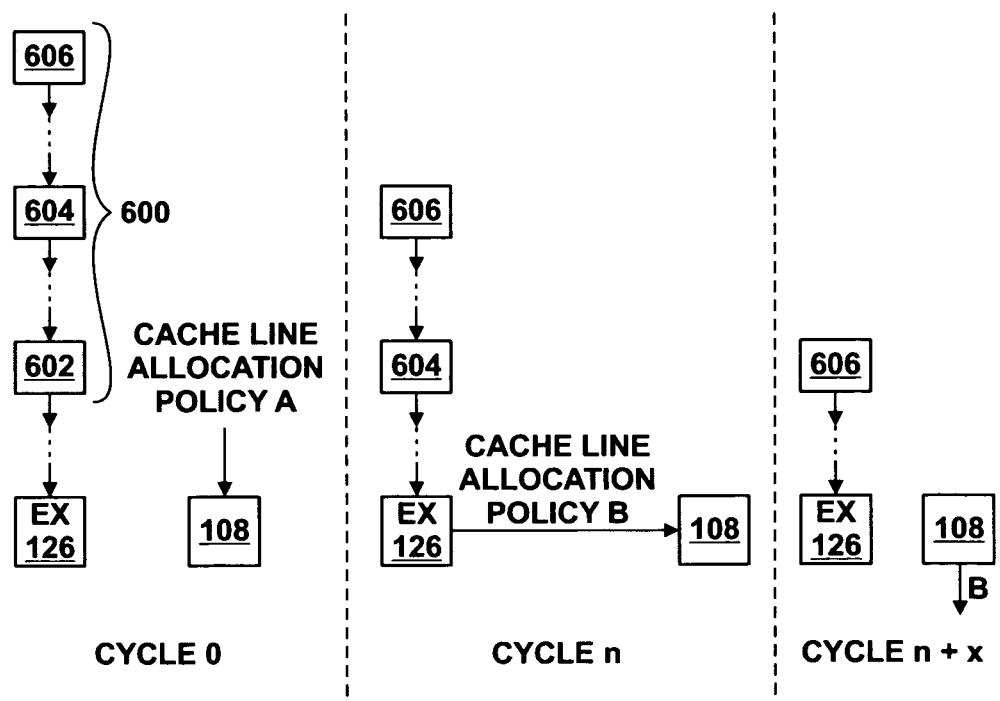
FIG. 6 is a diagram illustrating an exemplary operation of the technique of FIG. 5 in accordance with at least one embodiment of the present disclosure.

FIG. 6 illustrates an exemplary operation of an instruction sequence 600 that implements cache allocation instructions in accordance with at least one embodiment of the present disclosure. In the illustrated example, the instruction sequence 600 includes instructions 602, 604 and 606 to be executed by the execution stage 126 (FIG. 1) in the indicated order. The instructions 602 and 604 act on an identified memory address or memory region and the instruction 604 is a cache allocation instruction for the purpose of implementing an alternate cache line allocation policy B for the identified memory address or memory region.

At cycle 0, the cache controller 108 is configured to implement a cache line allocation policy A that configures the cache 110 (FIG. 1) to deny cache line allocation for the identified memory address or memory region. Accordingly, when the instruction 602 is submitted for execution, no cache line is allocated for a read operation or a write operation resulting from the execution of the instruction 602 in accordance with the default cache line allocation policy A.

At cycle n, the cache allocation instruction 604 is submitted for execution by the execution state 126. In this example, the cache allocation instruction 604 includes as an operand a value representative of an alternate cache line allocation policy B for which cache line allocation for the identified memory address or memory region is permitted. Accordingly, upon execution of the cache allocation instruction 604, the execution stage 126 configures the cache controller 108 to implement the cache line allocation policy B, thereby configuring the cache controller to permit cache line allocation for the identified memory address.

At cycle n+x, the instruction 606 is submitted for execution by the execution stage 126. However, unlike the situation for instruction 602 at cycle 0, the cache is at this point configured to implement the alternate cache line allocation policy B, so a read operation or a write operation resulting from the execution of the instruction 606 can result in a cache line allocation for the instruction 606.

Figure 7:
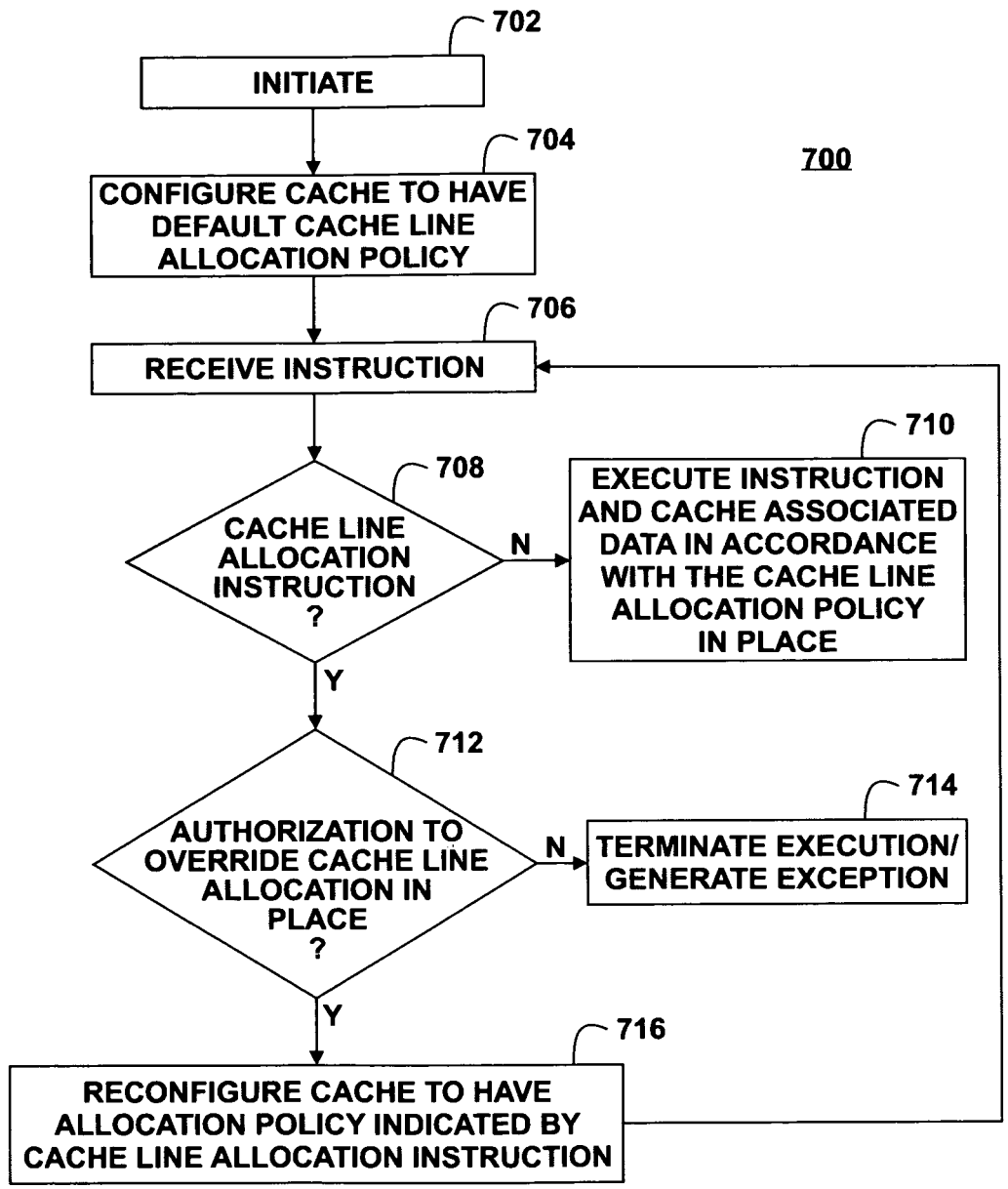
FIG. 7 is a flow diagram illustrating an exemplary method for reconfiguring a cache line allocation policy of a cache during an execution of an instruction in accordance with at least one embodiment of the present disclosure.

FIG. 7 illustrates an exemplary method 700 for configuring a cache line allocation policy of a cache using a cache allocation instruction in accordance with at least one embodiment of the present disclosure. The method 700 includes initiating operation of a processing device having a cache at event 702 in response to an initialization action, such as a power on reset (POR), the loading of a program, and the like. At block 704, the method 700 includes configuring the cache to implement a default, or instruction-independent, cache line allocation policy for each of a plurality of memory addresses or memory regions. At event 706, processing of an instruction to be executed begins at a processing core (e.g., processing core 106, FIG. 1). Accordingly, at decision block 708, the method 700 includes determining whether the instruction is a cache allocation instruction.

In the event that the instruction is not a cache allocation instruction, the method 700 includes executing the instruction and caching data for the instruction in accordance with the cache line allocation policy in place at block 710. Otherwise, if the instruction is a cache allocation instruction, the method 700 includes determining an authorization to override the default cache line allocation policy for the memory address or memory region at decision block 712. As discussed above, authorization to override can be indicated as, for example, an override bit or bits associated with the default cache line allocation policy.

In the event that overriding the default cache line allocation policy is not authorized, the method 700 includes terminating execution of the cache allocation instruction at block 714 and moving on to the next instruction at event 706. Alternately, an exception can be generated at block 714 to indicate a potential error condition. In the event that overriding the default cache line allocation policy is authorized, the method 700 includes reconfiguring the cache to implement the alternate cache line allocation policy indicated by the cache allocation instruction at block 716. In one embodiment, the cache can be configured accordingly by storing a value representative of the alternate cache line allocation policy in one or more registers of a cache controller that are used to control cache line allocation by the cache controller, or by providing one or more signals indicating desired caching actions to be implemented by the cache 110. The flow of method 700 then returns to event 706 for the next instruction to be executed.

The above-disclosed subject matter is to be considered illustrative, and not restrictive, and the appended claims are intended to cover all such modifications, enhancements, and other embodiments which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    configuring a cache to have a first cache line allocation policy for a memory address;
    receiving a first instruction associated with the memory address;
    receiving a second instruction subsequent to receiving the first instruction;
    determining a second cache line allocation policy based on a number of accesses to the memory address that have occurred during an execution period prior to receiving the first instruction;
    reconfiguring the cache to have the second cache line allocation policy in response to receiving the first instruction; and
    caching information associated with the second instruction at the cache in accordance with the second cache line allocation policy as set in response to receiving the first instruction.

2. The method of claim 1, wherein the first cache line allocation policy comprises an instruction-independent cache line allocation policy for the memory address and the second cache line allocation policy comprises an instruction-dependent cache line allocation policy for the memory address.

3. The method of claim 1, wherein the execution period comprises one of:
    a predetermined number of clock cycles or a predetermined number of executed instructions.

4. The method of claim 1, wherein the first instruction comprises a PUSH instruction.

5. The method of claim I, further comprising:
    caching information associated with the first instruction at the cache in accordance with the second cache line allocation policy.

6. The method of claim I, wherein:
    determining a second cache line allocation policy comprises determining an authorization to override the first cache line allocation policy; and
    reconfiguring the cache to have the second cache line allocation policy comprises reconfiguring the cache to have the second cache access policy in response to determining an override of the first cache line allocation policy is authorized; and
    maintaining the cache as having the first cache line allocation policy in response to determining an override of the first cache line allocation policy is not authorized.

7. A data processor comprising:
    a processor core
        receive and execute a first instruction associated with a memory address; and
        receive and execute a second instruction associated with the memory address subsequent to receiving the first instruction;
    a cache comprising a plurality of cache lines; and
    a cache allocation module to determine a first cache line allocation policy based on a number of memory accesses to the memory address that have occurred during an execution period prior to receiving the first instruction and to reconfigure the cache to have the first cache line allocation policy for execution of both the first instruction and the second instruction at the processor core.

8. The data processor of claim 7, wherein the cache controller is further configured to configure the cache to have a second cache line allocation policy for the memory address prior to execution of the first instruction of the processor core.

9. The data processor of claim 8, wherein the cache allocation module is to determine an authorization to override the second cache line allocation policy; and
- wherein the cache controller is to reconfigure the cache to have the first cache line allocation policy in response to determining an override of the second cache line allocation policy is authorized.

10. The data processor of claim 7, further comprising.:
a cache controller to cache information associated with the second instruction at the cache in accordance with the first cache line allocation policy:

11. The data processor of claim 7, further comprising:
a cache controller to:
- cache information associated with the first instruction at the cache in accordance with the first cache line allocation policy; and
- cache information associated with the second instruction at the cache in accordance with the first cache line allocation policy.

12. The data processor of claim 7, wherein the instruction comprises a PUSH instruction.

13. The data processor of claim 7, wherein the execution period comprises one of: a predetermined number of clock cycles or a predetermined number of executed instructions.

* * * * *

UNITED STATES PATENT AND TRADEMARK OFFICE
CERTIFICATE OF CORRECTION

| | | |
|---|---|---|
| PATENT NO. | : 8,606,998 B2 | Page 1 of 1 |
| APPLICATION NO. | : 11/509178 | |
| DATED | : December 10, 2013 | |
| INVENTOR(S) | : John M. Zulauf | |

It is certified that error appears in the above-identified patent and that said Letters Patent is hereby corrected as shown below:

In the Claims:

Column 12, line 33, (claim 5, line 1) replace "I," with "1,".

Column 12, line 37, (claim 6, line 1) replace "I," with "1,".

Column 12, line 50, (claim 7, line 2) insert --to:-- after the word "core".

Column 13, line 8, (claim 10, line 1) replace "comprising.:" with "comprising:".

Column 13, line 11, (claim 10, line 4) replace "policy:" with "policy.".

Signed and Sealed this
Eleventh Day of March, 2014

Michelle K. Lee
*Deputy Director of the United States Patent and Trademark Office*